Nov. 19, 1968   J. C. RITTER   3,411,688
WELDING CORE FOR TUBES
Filed Jan. 20, 1967

INVENTOR.
JULIUS C. RITTER
BY Ernest J. Weinberger
    L. D. Appleton
ATTORNEYS

United States Patent Office 3,411,688
Patented Nov. 19, 1968

3,411,688
WELDING CORE FOR TUBES
Julius C. Ritter, Lexington, Mass., assignor to the United States of America as represented by the Secretary of the Navy
Filed Jan. 20, 1967, Ser. No. 610,693
3 Claims. (Cl. 228—50)

ABSTRACT OF THE DISCLOSURE

A ceramic ferrule or core is used in the welding of tubes. The core is fabricated of a magnesium aluminum silicate ceramic also termed "industrial stoneware" in the form of a hollow cylinder having an outwardly extending flange at one end thereof. The tube to be welded to a header or other structure is placed into a hole therein with the walls defining the opening abutting the outer surface of the tube and with the end of the tube being slightly below the header surface. The header hole is somewhat enlarged so as to form a recess about the end of the tube. With the ferrule inserted into the tube and said flange disposed in the recess, the welding operation is accomplished in a defined sequence. The flange of the core is destroyed in the welding operation and the resulting opening at the juncture of the tube and header requires only a minimum of tooling. Thereafter the ceramic core is broken away and removed leaving an extremely good weldment. The specific composition of the core is completely defined.

Background of the invention

The invention described herein relates to welding cores and more particularly to a special composition and form of a ceramic core for welding tubes to other structures such as the header of a steam boiler.

Where a tube is to be welded to another structure and the resulting joint is to be subjected to both high temperature and pressure without any leakage therefrom, there exist two present methods for the possible fabrication of such a leak-tight joint weld. One method is to roll or expand the tube against the hole in the header and then to provide a weld therebetween. This, however, does not reliably provide a leakproof joint when subjected to high pressure and temperature. In a second method, a metal plug or collar is inserted into the end of the tube after it is disposed within the header. A weld is then made joining the header, tube and the metal plug together. Subsequently, it is necessary to drill or machine out the plug. Although this latter technique is an improvement over the former rolling operation, it still results in an appreciable number of weld cracks caused by the drilling of the plug and thinning its wall or actually penetrating the tube wall. Additionally, considerable time and expense are involved in both making the metal plugs and in drilling them out especially in difficult locations.

Summary of the invention

The invention herein contemplates the use of a ceramic core or ferrule composed of magnesium aluminum silicate in the welding of tube joints. The ferrule is in the form of a hollow cylinder having an outwardly extending flange at one end thereof. In the technique of operation the tube to be welded is inserted into the hole in the header, lightly rolled to retain it therein and the tube end is then milled flush with the header counterbored area. The ferrule is inserted into the tube end with the flange extending outwardly. The weld joint is then made around the flange which is burned off leaving a satisfactory opening which does not require any drilling. The ferrule is physically broken and removed.

Summary of the invention

The invention herein contemplates a hollow cylindrical ceramic core which is provided an outwardly flange at one end. The core is inserted into a tube to be welded (e.g., to a header) and is proportioned thereto with the flange resting against the end of the tube. After the welding operation is completed, the core is broken away and removed leaving a smooth continuous opening which does not require any further machining. The core is of a magnesium aluminum silicate which is inert but in the welding operation the flange is melted away to provide the proper diameter.

An object of this invention is to provide tube welding ferrules which alleviate the necessity of subsequent drilling and reaming of the opening after the welding operation is completed.

Another object is to provide a ceramic welding core which is simple, inexpensive, reliable, and easily employed in a method of welding of tubes so as to substantially minimize the costs and the machining procedures.

Other objects and advantages will appear from the following description of an example of the invention, and the novel features will be particularly pointed out in the appended claims.

Brief description of the drawings

In the accompanying drawings.

Description of a preferred embodiment

Figure 1:
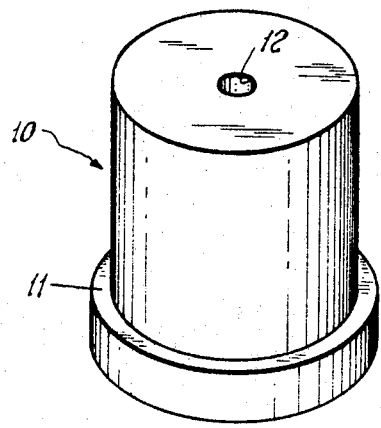
FIG. 1 is a perspective view of a welding ferrule made in accordance with the principles of this invention.

The ferrule or core 10 illustrated in FIG. 1 has the general configuration of a hollow cylinder which is provided with an outwardly extending flange 11 at one end thereof. The outer diameter of the core is selected so as to slidingly fit into the pipe or tube which is to be welded while the inner diameter or opening 12 is such as to provide sufficient wall thickness with only a minimum of material. The thickness of the flange is selected, as will be explained hereinafter, so that the final weld will be smooth and in registration with the tube opening. A portion of the flange is melted away during the welding.

The configuration of the outer wall should conform to the inner surface of the tube to be welded so that it may assume many different shapes and forms from square to elliptic. In any case the same general principles apply. Considerable work has been performed to ascertain the most suitable material composition for the core. A specific composition of magnesium, aluminum silicate satisfies all the necessary requisites involved.

Figure 2:
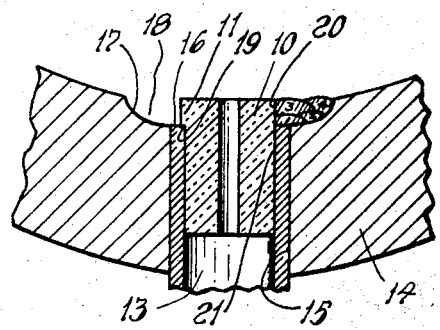
FIG. 2 is a sectional view of the ferrule in a tube during a welding operation.

FIG. 2 illustrates the core 10 inserted into a tube or pipe 13 which is to be welded to a header 14. The header 14 is provided with a hole 15 through which the tube 13 passes and whose upper edge 16 terminates level with the lower surface 17 of the counterbore 18 in the header. The counterbored area 18 provides the cavity in which the weld is placed. The shoulder 19 of the flange 11 abuts the upper edge 16 of the tube and supports the core therein. Although not shown, the tube may be fitted tightly into the header, or in the alternative, the upper edge thereof slightly rolled to support it therein. For the sake of clarity one side of the drawing has been shown with the weld material in the counterbored area while it has been deleted from the other side. As indicated on the side which shows the weld, the flange is melted away and the weldment edge 20 is aligned with the inner wall surface 21 of the tube 13.

Figure 3:
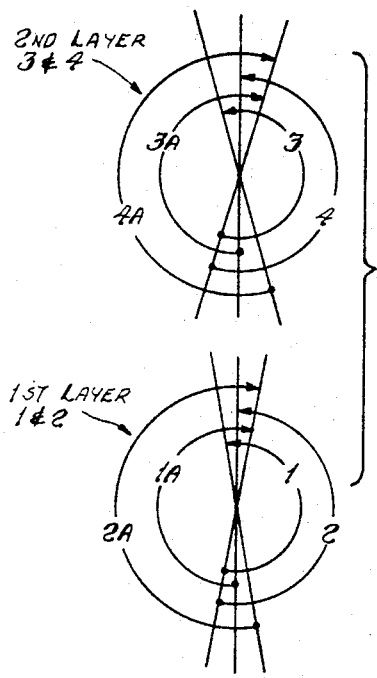
FIG. 3 illustrates the weld bead sequence employed in welding the tube and a header.
Figure 4:
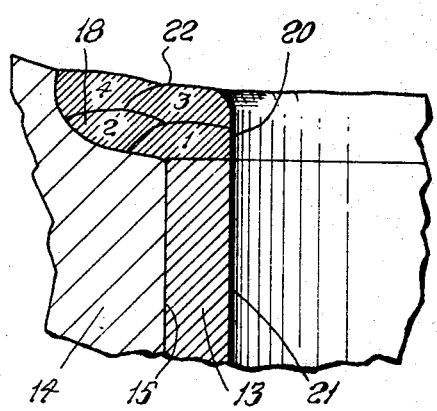
FIG. 4 shows in perspective a finished weldment with the ferrule removed.

The welding operation proceeds in accordance with the showing in FIG. 3 and is deposited in layers 22 shown in FIG. 2. This procedure insures a proper weld and provides extremely satisfactory results for the ceramic core arrangement. After the weld is completed, the ceramic core is destroyed and removed leaving a clean aligned continuous opening. The photomacrograph illustration of FIG. 4 was magnified five (5) times and clearly shows the final structure after practicing the operation in accordance with the principles of this invention.

Summarizing the overall technique, the tube is inserted into the tube holes in the header, lightly rolled to hold it in position and then the end thereof leveled or milled flush with the header counterbored area. The ceramic core or ferrule is then inserted into the end of the tube. The shoulder or flange of the core serves two functions. First, is that it serves as a definite stop thereby insuring that the core always depends into the tube the same distance with a fixed portion projecting outward thereof. Secondly, the flange is calculated to be of such a size that the heat of the arc during welding melts the ceramic flange away exactly enough so as to create a finished weld exactly equal to the inside diameter of the tube. After the welding is completed, the core is easily removed by breaking it and removing the parts. This saves both time and expense in that no further machining, reaming, drilling or any other mechanical operation is necessary. The ceramic cores are inexpensive, costing only several cents, when compared to metal plugs. Finally, it should be noted that the ceramic material is inert and has no deleterious effects on the weld material whereas a metal plug melts and combines with the weld metal to form an alloy which changes the mechanical properties of the weld.

The ceramic ferrule which has been successfully employed was composed of "ceramic clay" or as it is otherwise known "industrial stoneware." These are composition materials which are well known in the art and fully disclosed in the following two references both published by McGraw-Hill: Chemical Dictionary authored by Hackh and Materials Handbook by Brady.

A specific composition of the generic material which is preferred consists of the following:

| Material | Weight in pounds | Percent by weight |
| --- | --- | --- |
| Victoria Ball Clay | 35 | 30.0 |
| Loomes Talc | 24 | 20.6 |
| Georgia China Kingsley | 29 | 24.8 |
| Feldspar | ½ | 0.4 |
| Pyrophylite | 10 | 8.6 |
| Goulac | 2¾ | 2.3 |
| Water | 15½ | 13.3 |

These materials are defined in the aforementioned literature and are mixed together and heated to a killing (deadheat) or baking temperature of about 2350° F. and maintained thereat for 11 hours. The mixture is then cured by chilling in a form to provide the shape of the ferrule as described hereinbefore.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:
1. A ferrule for welding a tube to a plate-like structure which is provided with an opening therethrough for receiving said tube and having a counterbored area thereabout, comprising:
   a tubular member of a ceramic material having an outer contour to slidingly fit into said tube,
   said member being provided with an outwardly extending flange at one end thereof,
   whereby when said tube is placed in said opening and flush with the surface of said area and said member disposed in said tube with said flange opposite said area, said tube may be welded to said structure and said member thereafter removed leaving a hole aligned with said tube and continuous therewith.

2. The ferrule according to claim 1, wherein said ferrule is of an industrial stoneware.

3. The ferrule according to claim 1, wherein said ferrule consists of a mixture of the following in proportions by weight:

Victoria ball clay _____ 30.0
Loomes talc _____ 20.6
Georgia China Kingsley _____ 24.8
Feldspar _____ 0.4
Pyrophylite _____ 8.6
Goulac _____ 2.3
Water _____ 13.3 wherein said mixture is baked at approximately 2350° F. for 11 hours and thereafter cured by chilling.

References Cited

FOREIGN PATENTS 805,679  12/1958  Great Britain.

RICHARD H. EANES, JR., *Primary Examiner.*